(12) United States Patent
Liu et al.

(10) Patent No.: US 12,443,431 B2
(45) Date of Patent: Oct. 14, 2025

(54) METHOD AND APPARATUS FOR CREATING VIRTUAL MACHINES BASED ON AN AUTHENTICATION REQUEST FROM A USER (71) Applicant: Huawei Cloud Computing Technologies Co., Ltd., Guizhou (CN)

(72) Inventors: Tiesheng Liu, Shenzhen (CN); Yanjie Guan, Gui'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 18/625,580

(22) Filed: Apr. 3, 2024

(65) Prior Publication Data
US 2024/0272930 A1 Aug. 15, 2024

Related U.S. Application Data (63) Continuation of application No. 17/026,767, filed on Sep. 21, 2020, now Pat. No. 11,960,915, which is a
(Continued)

(30) Foreign Application Priority Data

Mar. 22, 2018 (CN) .......................... 201810241274.8

(51) Int. Cl.
G06F 9/455 (2018.01)
G06F 9/50 (2006.01)

(52) U.S. Cl.
CPC ........ *G06F 9/45558* (2013.01); *G06F 9/5027* (2013.01); *G06F 9/5077* (2013.01);
(Continued)

(58) Field of Classification Search
None
See application file for complete search history.

(56) References Cited

U.S. PATENT DOCUMENTS 8,473,947 B2 6/2013 Goggin et al.
9,489,224 B2 * 11/2016 Motoki ............... G06F 9/45533
(Continued)

FOREIGN PATENT DOCUMENTS

CN 103778443 A 5/2014
CN 103810015 A 5/2014
(Continued)

*Primary Examiner* — Eric C Wai
(74) *Attorney, Agent, or Firm* — Conley Rose, P.C.

(57) ABSTRACT

A method for creating a virtual machine includes receiving a virtual machine creation request comprising parameter information of a virtual network interface card occupied by a to-be-created virtual machine; obtaining current resource usage information of the network interface card resource pools of at least one computing node, wherein the at least one computing node is deployed on a cloud platform, each computing node comprises a network interface card resource pool comprising physical network interface cards; determining a target computing node, in the at least one computing node based on the parameter information and the current resource usage information; and invoking the target computing node to create the virtual machine.

20 Claims, 7 Drawing Sheets

Related U.S. Application Data continuation of application No. PCT/CN2019/078813, filed on Mar. 20, 2019.

(52) U.S. Cl.
CPC .............. *G06F 2009/45562* (2013.01); *G06F 2009/45595* (2013.01); *G06F 2209/5011* (2013.01)

(56) References Cited

U.S. PATENT DOCUMENTS

| | | |
|---|---|---|
| 11,140,020 B1 * | 10/2021 | Baniani ................. H04L 45/745 |
| 2015/0207678 A1 | 7/2015 | Li et al. |
| 2015/0277951 A1 | 10/2015 | Sundararaman et al. |
| 2015/0326449 A1 | 11/2015 | Melander et al. |
| 2016/0269318 A1 | 9/2016 | Su et al. |
| 2016/0306647 A1 | 10/2016 | Xia |
| 2018/0121223 A1 | 5/2018 | Cui et al. |

FOREIGN PATENT DOCUMENTS

| | | | |
|---|---|---|---|
| CN | 104168135 A | 11/2014 | |
| CN | 105224392 A | 1/2016 | |
| CN | 105656969 A | 6/2016 | |
| CN | 105718297 A | 6/2016 | |
| CN | 107346264 A | 11/2017 | |
| CN | 108614726 A | 10/2018 | |
| WO | 2017152633 A1 | 9/2017 | |

* cited by examiner

METHOD AND APPARATUS FOR CREATING VIRTUAL MACHINES BASED ON AN AUTHENTICATION REQUEST FROM A USER

CROSS-REFERENCE TO RELATED APPLICATIONS

This is a continuation of U.S. patent application Ser. No. 17/026,767 filed on Sep. 21, 2020, which is a continuation of International Patent Application No. PCT/CN2019/078813, filed on Mar. 20, 2019, which claims priority to Chinese Patent Application No. 201810241274.8, filed on Mar. 22, 2018. All of the aforementioned patent applications are hereby incorporated by reference in their entireties.

TECHNICAL FIELD

This disclosure relates to the field of cloud computing technologies, and in particular, to a method and an apparatus for creating a virtual machine.

BACKGROUND

A single-root input/output virtualization (SR-IOV) technology is also referred to as a hardware pass-through technology. In this technology, a single peripheral component interconnect express (PCIe) device can appear virtually in a plurality of independent PCIe devices for an upper-layer service. Currently, in the field of cloud computing technologies, the SR-IOV technology is widely applied to a cloud platform. For example, a physical network interface card that supports the SR-IOV technology is configured on a computing node on the cloud platform. In this way, when creating a virtual machine, the cloud platform may generate a virtual function (VF) using the physical network interface card that supports the SR-IOV technology, and uses the generated VF as a virtual network interface card of the virtual machine on the computing node. One physical network interface card that supports the SR-IOV technology can usually be virtualized into a plurality of VFs.

In a related technology, when the upper-layer service requires the cloud platform to provide a virtual machine, a user further needs to select an appropriate computing node from a plurality of computing nodes managed by the cloud platform to create the virtual machine. Different virtual machines have different performance requirements. For example, some virtual machines have high requirements on a bandwidth and latency. When these virtual machines run on a same computing node, a computing node resource may be insufficient. Complex resource planning required for various situations greatly increases complexity of service provisioning and degrades system performance.

SUMMARY

Embodiments of this disclosure provide a method and an apparatus for creating a virtual machine, to resolve problems of high complexity and low system performance during virtual machine creation in a related technology. The technical solutions are as follows.

According to a first aspect, a method for creating a virtual machine is provided, where the method is applied to a cloud platform, each computing node on the cloud platform includes a network interface card resource pool, the network interface card resource pool includes each physical network interface card configured on the computing node, and the method includes receiving a virtual machine creation request, where the virtual machine creation request includes parameter information of a virtual network interface card occupied by a to-be-created virtual machine, obtaining current resource usage information of the network interface card resource pool of each computing node on the cloud platform, determining, in at least one computing node on the cloud platform based on the parameter information and the current resource usage information of each network interface card resource pool, a target computing node used to create a virtual machine, and invoking the target computing node to create the virtual machine.

According to the method provided in the embodiments of this disclosure, a network resource on each computing node on the cloud platform is pooled, and a network interface card resource pool is configured for each computing node. Therefore, resources of all physical network interface cards configured on each computing node are centrally scheduled for use by an upper-layer service. Therefore, the cloud platform can automatically schedule the to-be-created virtual machine to an appropriate computing node for creation based on the parameter information of the virtual network interface card occupied by the to-be-created virtual machine and the current resource usage information of the network interface card resource pool of each computing node. Therefore, in the embodiments of this disclosure, a user does not need to independently select an appropriate computing node, different performance requirements of different virtual machines are considered, and a situation in which a computing node resource is insufficient because a plurality of virtual machines having high requirements on a bandwidth and latency are configured on a same computing node does not occur. This fully and appropriately uses a network resource of the computing node. In addition, in the embodiments of this disclosure, because the user does not need to perform complex resource planning in various situations, complexity of service provisioning is low, and system performance is improved.

In a first possible implementation of the first aspect, the parameter information includes a quantity of virtual network interface cards and a virtual network interface card bandwidth that are occupied by the to-be-created virtual machine, and affinity information of the virtual network interface card occupied by the virtual machine.

The affinity information is used to indicate whether different virtual network interface cards occupied by a same virtual machine come from a same physical network interface card. When the affinity information indicates keeping affinity, the different virtual network interface cards occupied by the same virtual machine come from the same physical network interface card. When the affinity information indicates keeping anti-affinity, the different virtual network interface cards occupied by the same virtual machine come from different physical network interface cards.

In the embodiments of this disclosure, the affinity information is specified. For example, different virtual network interface cards are specified to be from a same physical network interface card. This can improve forwarding efficiency. If different virtual network interface cards are specified to be from different physical network interface cards, even if one physical network interface card is faulty, another virtual network interface card of the virtual machine is not affected. This can improve reliability of the virtual machine.

With reference to the first aspect, in a second possible implementation of the first aspect, the method further includes obtaining network interface card information of each physical network interface card in the network interface card resource pool of each computing node, for each network interface card resource pool, determining a quantity of available virtual network interface cards and an available virtual network interface card bandwidth that are of each physical network interface card in the network interface card resource pool based on the network interface card information of each physical network interface card in the network interface card resource pool, using the quantity of available virtual network interface cards and the available virtual network interface card bandwidth that are of each physical network interface card in the network interface card resource pool as the resource usage information of the network interface card resource pool, storing the resource usage information of the network interface card resource pool into a cloud platform database, and the obtaining current resource usage information of the network interface card resource pool of each computing node on the cloud platform includes obtaining the current resource usage information of the network interface card resource pool of each computing node from the cloud platform database.

With reference to the second possible implementation of the first aspect, in a third possible implementation of the first aspect, the method further includes, after the target computing node is determined, recalculating resource usage information of a network interface card resource pool of the target computing node based on the parameter information, and storing updated resource usage information of the target computing node into the cloud platform database.

With reference to the first aspect, in a fourth possible implementation of the first aspect, the determining, in at least one computing node on the cloud platform based on the parameter information and the current resource usage information of each network interface card resource pool, a target computing node used to create a virtual machine includes obtaining a current available central processing unit (CPU) resource and a current available memory resource of each computing node on the cloud platform, determining a candidate computing node in the at least one computing node on the cloud platform based on the current available CPU resource and the current available memory resource of each computing node, and determining the target computing node in the candidate computing node based on the parameter information and the current resource usage information of each network interface card resource pool.

With reference to the first aspect, in a fifth possible implementation of the first aspect, the method further includes, after the virtual machine is created, if a current bandwidth of any virtual network interface card occupied by the virtual machine is greater than a target bandwidth specified in the parameter information, limiting the bandwidth occupied by the any virtual network interface card within the target bandwidth.

In the embodiments of this disclosure, on a basis of constructing the network interface card resource pool, quality of service (QOS) of a bandwidth can be further set for a virtual network interface card occupied by a created virtual machine. This ensures that the bandwidth is appropriately used between virtual machines and between network interface cards in the virtual machine, and avoids mutual preemption of a bandwidth resource and affecting the upper-layer service.

According to a second aspect, an apparatus for creating a virtual machine is provided, where the apparatus is configured to perform the method for creating a virtual machine according to the first aspect.

According to a third aspect, a storage medium is provided, where the storage medium stores at least one instruction, at least one program, a code set, or an instruction set, and the at least one instruction, the at least one program, the code set, or the instruction set is loaded and executed by a processor to implement the method for creating a virtual machine according to the first aspect.

According to a fourth aspect, a computer program product including an instruction is provided, where when the instruction is run on a computer, the computer is enabled to perform the method for creating a virtual machine according to the first aspect.

According to a fifth aspect, a cloud platform is provided, where the cloud platform includes the apparatus for creating a virtual machine, and the apparatus for creating a virtual machine is configured to perform the method for creating a virtual machine according to the first aspect.

DESCRIPTION OF EMBODIMENTS

To make the objectives, technical solutions, and advantages of this disclosure clearer, the following further describes the implementations of this disclosure in detail with reference to the accompanying drawings.

Before the embodiments of this disclosure are described in detail, terms related to the embodiments of this disclosure are first described.

SR-IOV is also referred to as a hardware pass-through technology. In this technology, a single PCIe device can appear virtually in a plurality of independent PCIe devices for an upper-layer service. The hardware pass-through technology is mostly to meet a high bandwidth and low latency requirement of an application. For example, with rapid development of cloud computing technologies, more applications are deployed on a cloud platform, and some applications have relatively high requirements on a bandwidth and latency. Therefore, to meet the high bandwidth and low latency requirements of these applications, an SR-IOV technology is introduced to the cloud platform.

Channels virtualized using the SR-IOV are divided into two types a physical function (PF) and a VF. The PF is a complete PCIe device that provides comprehensive management and configuration functions. After a hypervisor of a computing node on the cloud platform identifies a physical network interface card that supports the SR-IOV, the hypervisor manages and configures all input/output (I/O)

resources of the physical network interface card using the PF. The hypervisor is a core of a virtualization technology, and is an intermediate software layer between a basic physical device and an operating system, and allows a plurality of operating systems and applications to share hardware.

The VF is a simplified PCIe device that provides only an I/O function. Therefore, the VF cannot be used to manage the physical network interface card that supports the SR-IOV. All VFs are derived from the PF. One physical network interface card that supports the SR-IOV may generate a plurality of VFs, for example, may generate 256 VFs. In the embodiments of this disclosure, the VF generated by the physical network interface card is used as a virtual network interface card of a virtual machine created on the computing node.

Figure 1A:
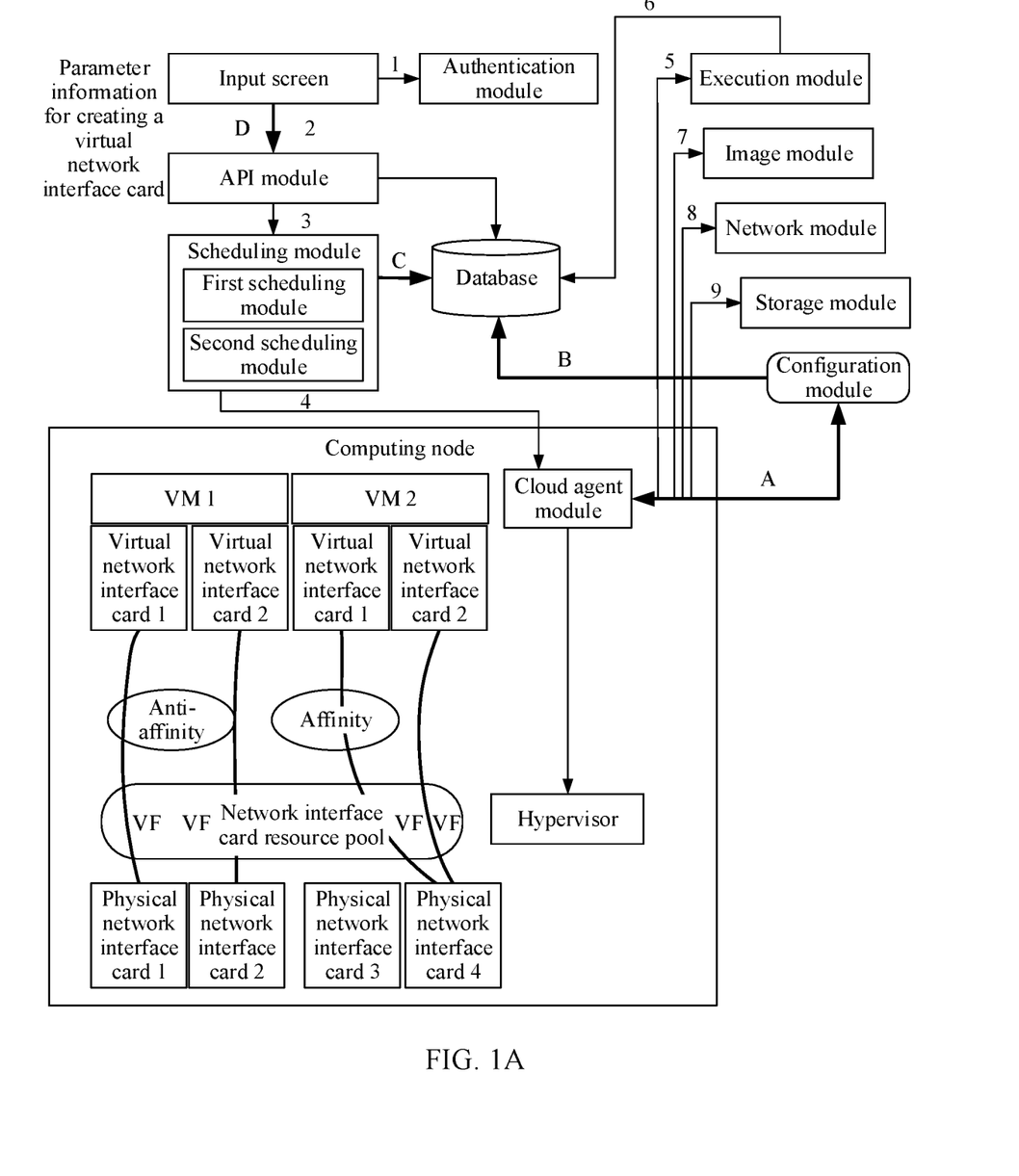
FIG. 1A is an architectural diagram of a cloud platform related to a method for creating a virtual machine according to an embodiment of this disclosure.

FIG. 1A is an architectural diagram of a cloud platform related to a method for creating a virtual machine according to an embodiment of this disclosure.

Referring to FIG. 1A, this embodiment of this disclosure implements SR-IOV resource cloudification, in an embodiment, a plurality of physical network interface cards of each computing node on the cloud platform form an SR-IOV resource pool for use by an upper-layer service. In this specification, the SR-IOV resource pool is also referred to as a network interface card resource pool. In this embodiment of this disclosure, the network interface card resource pool is configured, to centrally manage a plurality of physical network interface cards on each computing node, and centrally schedule a quantity of available virtual network interface cards and available virtual network interface card bandwidths of the plurality of physical network interface cards. For example, in FIG. 1A, a physical network interface card 1, a physical network interface card 2, a physical network interface card 3, and a physical network interface card 4 form a network interface card resource pool.

It should be noted that there may be a plurality of computing nodes on the cloud platform, and only one computing node is listed in FIG. 1A for description. For another computing node other than the computing node shown in FIG. 1A, a configuration similar to that of the computing node shown in FIG. 1A is provided.

In addition, a plurality of physical network interface cards that support SR-IOV may be configured on each computing node on the cloud platform. Each physical network interface card is connected to a different physical network plane, one physical network interface card can be virtualized into a plurality of VFs, and the physical network interface cards are independent of each other. In addition, one or more physical network interface cards may be configured on one computing node. In FIG. 1A, that only four physical network interface cards are configured is used as an example for description. A quantity of physical network interface cards configured on one computing node is not further limited in this embodiment of this disclosure.

The following describes, with reference to FIG. 1A, steps of constructing a network interface card resource pool on any computing node on the cloud platform.

Step A. As shown in FIG. 1A, a configuration module is disposed on the cloud platform, and the configuration module is configured to configure the network interface card resource pool on the computing node.

The configuration module is further configured to invoke a cloud agent module of each computing node, and the cloud agent module of each computing node collects network interface card information of each physical network interface card configured on the computing node.

In this embodiment of this disclosure, the network interface card information includes but is not limited to a network interface card model, a network interface card chip model, a network interface card bandwidth, and the like. This is not further limited in this embodiment of this disclosure.

Step B. After obtaining the network interface card information of the physical network interface card of each computing node, the configuration module determines an available resource in a network interface card resource pool of each computing node based on the network interface card information of the physical network interface card of each computing node, and stores the available resource in each network interface card resource pool into a cloud platform database.

The configuration module can determine, based on a network interface card model and a network interface card chip model of a physical network interface card, a quantity of virtual network interface cards that may be generated by the physical network interface card, and can determine, based on a network interface card bandwidth, an available virtual network interface card bandwidth of the physical network interface card.

In this embodiment of this disclosure, an available resource in a network interface card resource pool includes but is not limited to a quantity of available virtual network interface cards and an available virtual network interface card bandwidth that are of each physical network interface card in the network interface card resource pool, and the like. This is not further limited in this embodiment of this disclosure. In addition, in this embodiment of this disclosure, the available resource in each network interface card resource pool is stored in the cloud platform database, and is used as data provided by each computing node for SR-IOV resource cloudification, to support virtual machine scheduling.

A first point that should be noted is as follows. The network interface card information that is of the physical network interface card and that is obtained by the configuration module can be stored in the cloud platform database in this embodiment of this disclosure. After any network interface card resource pool is deployed on the cloud platform, if capacity expansion, capacity reduction, or hardware change is required for the network interface card resource pool, configuration needs to be updated on the configuration module, to update information related to an available resource in the network interface card resource pool stored in the cloud platform database.

A second point that should be noted is as follows. After selecting an optimal computing node used to create the virtual machine, a scheduling module further updates a current available resource in a network interface card resource pool of the computing node based on parameter information of a virtual network interface card occupied by the created virtual machine, and stores the updated data in the cloud platform database, to use for next SR-IOV resource scheduling.

The parameter information includes but is not limited to a quantity of virtual network interface cards and a virtual network interface card bandwidth that are occupied by a to-be-created virtual machine, and affinity information of the virtual network interface card occupied by the to-be-created virtual machine.

To apply any network interface card resource pool on the cloud platform, the following steps may be performed.

Step C. As shown in FIG. 1A, the scheduling module provided in this embodiment of this disclosure includes a first scheduling module and a second scheduling module, to schedule an SR-IOV resource.

In an embodiment, in this embodiment of this disclosure, the first scheduling module and the second scheduling module in FIG. 1A are configured to comprehensively select, from a plurality of computing nodes provided by the cloud platform, an optimal computing node to create the virtual machine.

Step D. As shown in FIG. 1A, a user specifies, on an input screen, parameter information of the virtual network interface card occupied by the to-be-created virtual machine.

The input screen may be a command line interface (CLI), a graphical user interface (GUI), or the like. This is not further limited in this embodiment of this disclosure.

In this embodiment of this disclosure, the quantity of virtual network interface cards is used to indicate a quantity of network interface cards that need to be occupied by the to-be-created virtual machine. The virtual network interface card bandwidth is used to indicate a size of a bandwidth of each virtual network interface card. The affinity information of the virtual network interface card is used to indicate whether different virtual network interface cards occupied by a same virtual machine come from a same physical network interface card. Therefore, this embodiment of this disclosure provides concepts of affinity and anti-affinity of the virtual network interface card. The affinity indicates that the different virtual network interface cards occupied by the same virtual machine come from the same physical network interface card. The anti-affinity indicates that the different virtual network interface cards occupied by the same virtual machine come from different physical network interface cards.

Figure 1B:
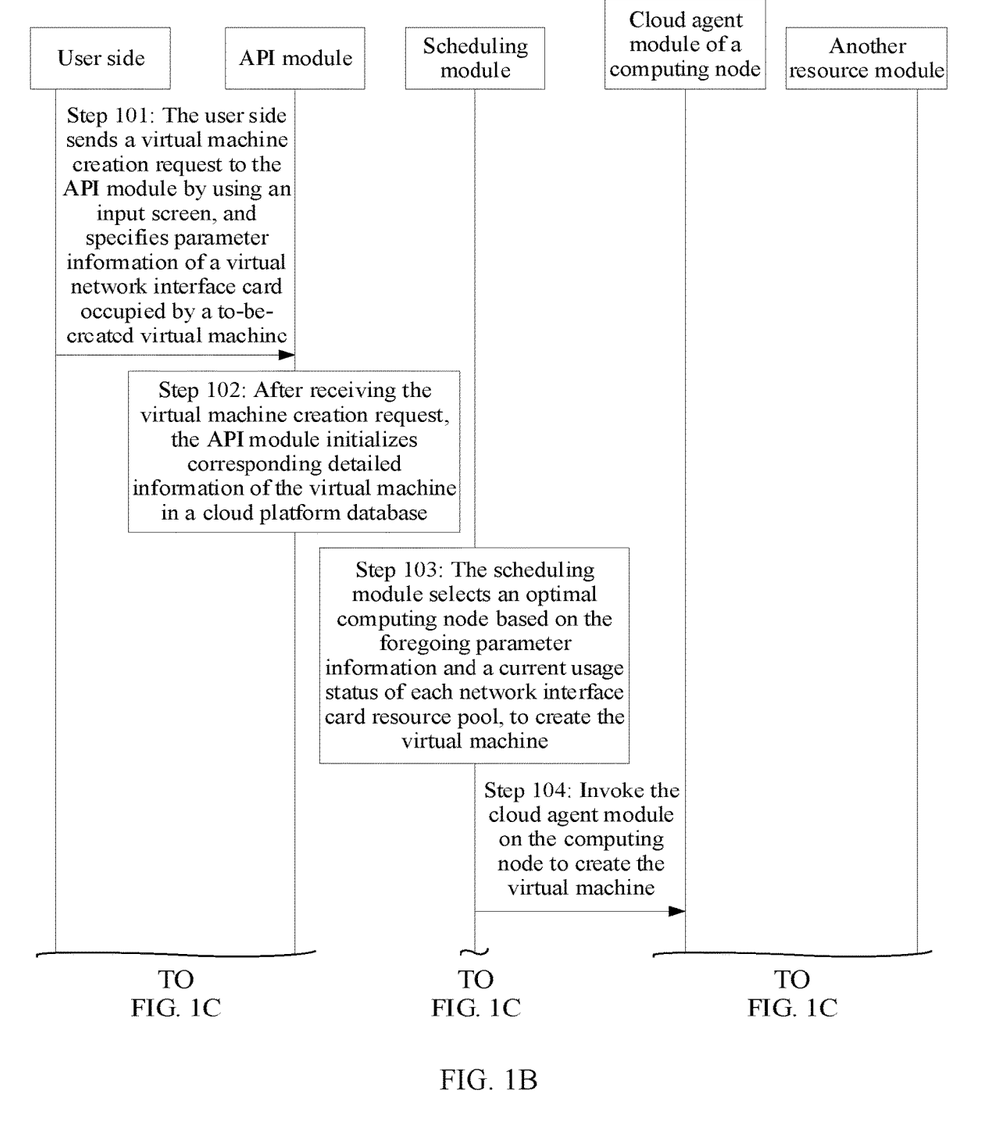
FIG. 1B and FIG. 1C are an overall process description of a method for creating a virtual machine according to an embodiment of this disclosure.
Figure 1C:
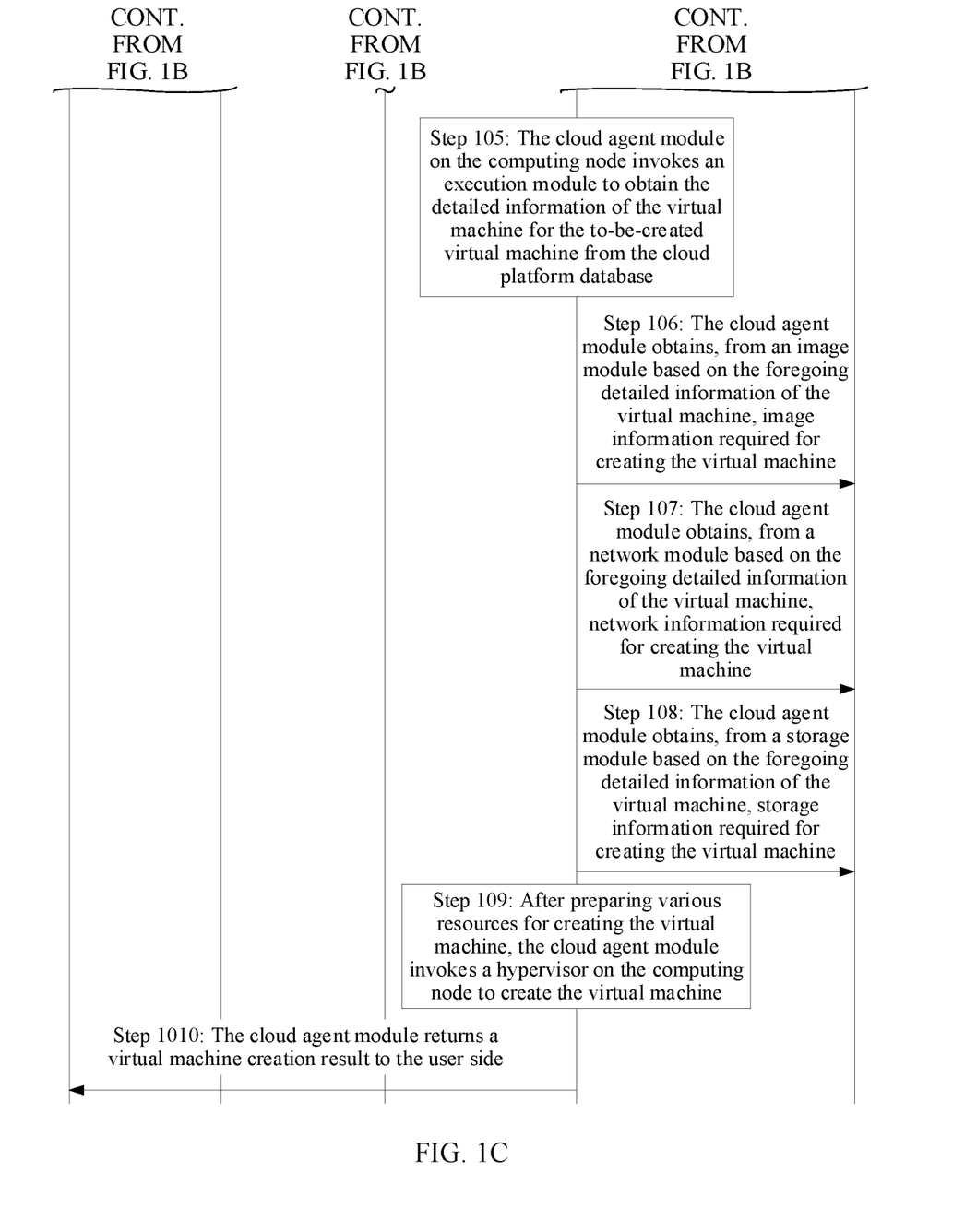

Referring to FIG. 1B and FIG. 1C, the following describes steps of creating a virtual machine based on a network interface card resource pool that is configured on a computing node and that is shown in FIG. 1A.

Step 101. A user side initiates an authentication request on an input screen to obtain valid authentication information, and sends a virtual machine creation request to an application programming interface (API) module on the input screen, to specify parameter information of a virtual network interface card occupied by a to-be-created virtual machine.

In this embodiment of this disclosure, in addition to the parameter information, CPU resource information, memory resource information, and the like of the to-be-created virtual machine may further be specified. This is not further limited in this embodiment of this disclosure.

Step 102. After receiving the virtual machine creation request, the API module initializes corresponding detailed information of the virtual machine in a cloud platform database.

The detailed information of the virtual machine includes the parameter information. In addition, the detailed information of the virtual machine may further include the CPU resource information, the memory resource information, and the like of the to-be-created virtual machine. This is not further limited in this embodiment of this disclosure.

Step 103. A scheduling module selects an optimal computing node based on the parameter information and a current usage status of each network interface card resource pool, to create the virtual machine.

Step 104. Invoke a cloud agent module on the computing node to create the virtual machine.

Step 105. The cloud agent module on the computing node invokes an execution module to obtain detailed information of the virtual machine for the to-be-created virtual machine from the cloud platform database.

Step 106. The cloud agent module obtains, from an image module based on the detailed information of the virtual machine, image information required for creating the virtual machine.

Step 107. The cloud agent module obtains, from a network module based on the detailed information of the virtual machine, network information required for creating the virtual machine.

It should be noted that a user may further specify, in the virtual machine creation request, a physical network interface card to create a VF, which is used as a virtual network interface card of the to-be-created virtual machine. In addition, in this embodiment of this disclosure, QoS of the virtual network interface card may further be limited. For detailed descriptions, refer to the following.

Step 108. The cloud agent module obtains, from a storage module based on the detailed information of the virtual machine, storage information required for creating the virtual machine.

Step 109. After preparing various resources for creating the virtual machine, the cloud agent module invokes a hypervisor on the computing node to create the virtual machine.

Step 1010. The cloud agent module returns a virtual machine creation result to the user side.

The following describes in detail, using an embodiment, a process of constructing a network interface card resource pool provided in this embodiment of this disclosure.

Figure 2:
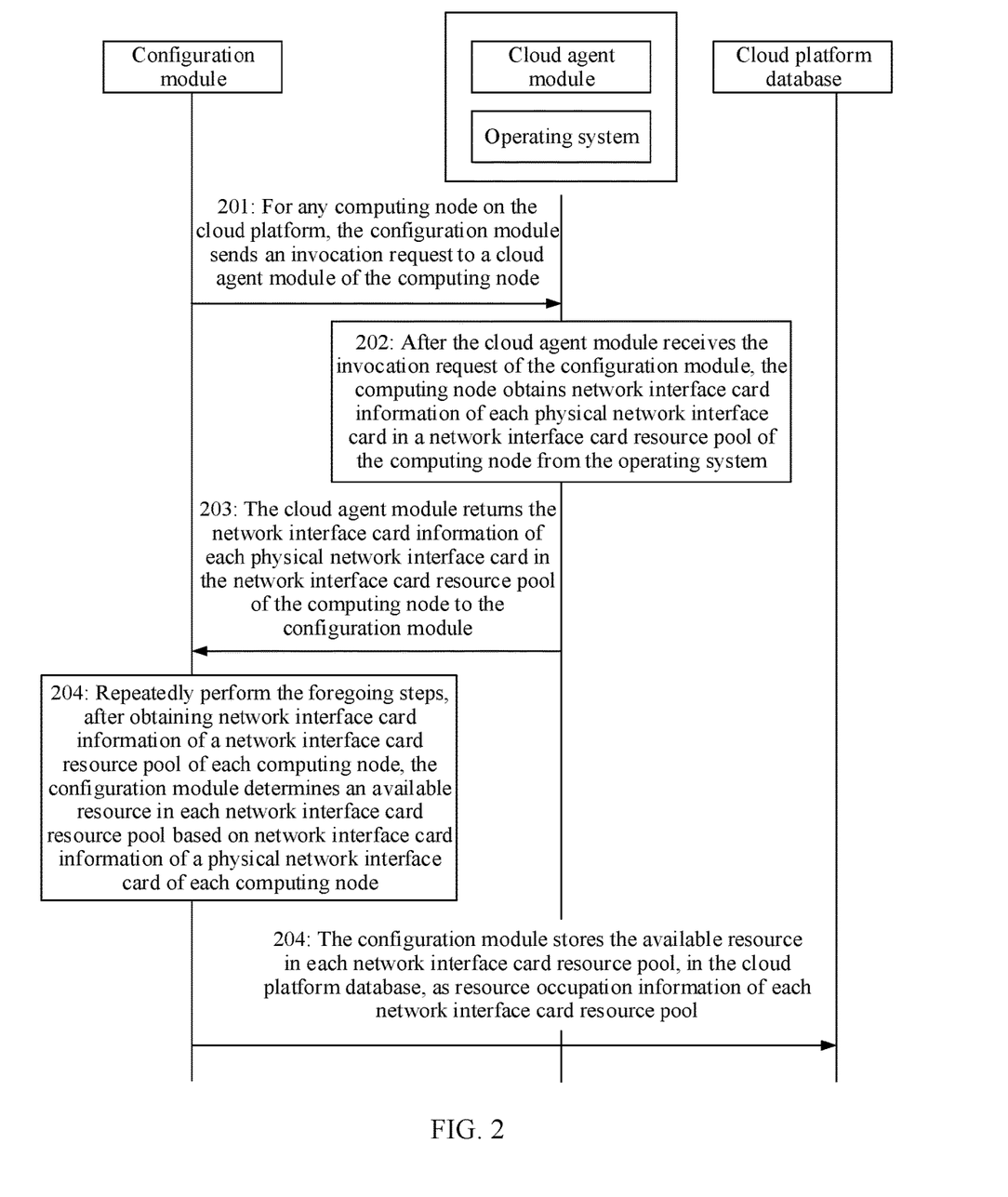
FIG. 2 is a flowchart of a method for constructing a network interface card resource pool according to an embodiment of this disclosure.

FIG. 2 is a flowchart of a method for constructing a network interface card resource pool according to an embodiment of this disclosure. The method is applied to a cloud platform. Each computing node on the cloud platform includes a network interface card resource pool, and the network interface card resource pool includes all physical network interface cards configured on the computing node. Referring to FIG. 2, a procedure of the method provided in this embodiment of this disclosure includes the following steps.

201. For any computing node on the cloud platform, a configuration module sends an invocation request to a cloud agent module of the computing node.

The invocation request is used to invoke a computing node to collect network interface card information of the computing node, and the network interface card information is further network interface card information of each physical network interface card in a network interface card resource pool of the computing node.

202. After the cloud agent module receives the invocation request of the configuration module, the computing node obtains the network interface card information of each physical network interface card in the network interface card resource pool of the computing node from an operating system.

203. The cloud agent module returns the network interface card information of each physical network interface card in the network interface card resource pool of the computing node to the configuration module.

204. Repeatedly perform the foregoing steps, after obtaining network interface card information of the network interface card resource pool of each computing node, the configuration module determines an available resource in each network interface card resource pool based on network interface card information of a physical network interface card of each computing node, and stores the available resource in each network interface card resource pool, in the cloud platform database, as resource usage information of each network interface card resource pool.

The network interface card information obtained by the configuration module can be stored in the cloud platform database in this embodiment of this disclosure.

According to the method provided in the embodiments of this disclosure, a network resource on each computing node on the cloud platform is pooled, and a network interface card resource pool is configured for each computing node. Therefore, resources of all physical network interface cards configured on each computing node are centrally scheduled for use by an upper-layer service. Therefore, the cloud platform can automatically schedule the to-be-created virtual machine to an appropriate computing node for creation based on the parameter information of the virtual network interface card occupied by the to-be-created virtual machine and the current resource usage information of the network interface card resource pool of each computing node. Therefore, in the embodiments of this disclosure, a user does not need to independently select an appropriate computing node, different performance requirements of different virtual machines are considered, and a situation in which a computing node resource is insufficient because a plurality of virtual machines having high requirements on a bandwidth and latency are configured on a same computing node does not occur. This fully and appropriately uses a network resource of the computing node. In addition, in the embodiments of this disclosure, because the user does not need to perform complex resource planning in various situations, complexity of service provisioning is low, and system performance is improved.

The following describes in detail, using an embodiment, a process of creating a virtual machine provided in this embodiment of this disclosure.

Figure 3:
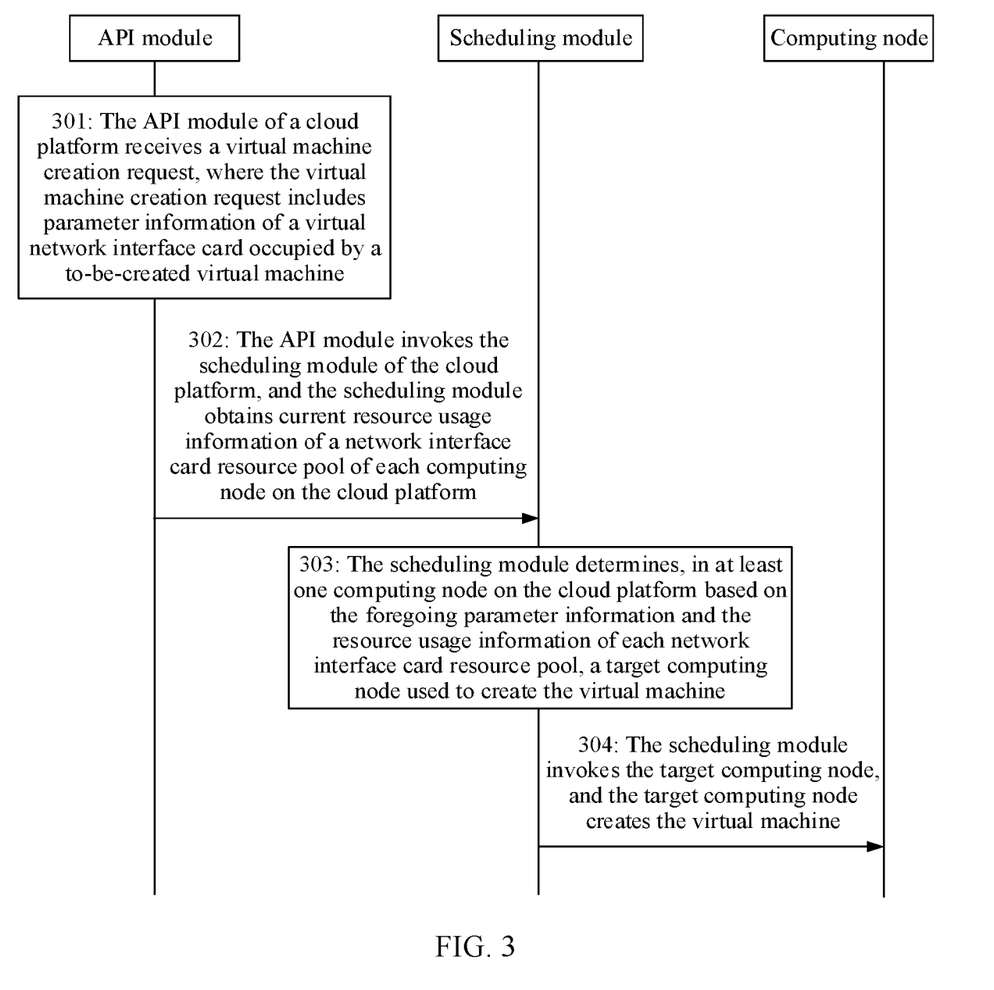
FIG. 3 is a flowchart of a method for creating a virtual machine according to an embodiment of this disclosure.

FIG. 3 is a flowchart of a method for creating a virtual machine according to an embodiment of this disclosure. The method is applied to a cloud platform. Each computing node on the cloud platform includes a network interface card resource pool, and the network interface card resource pool includes all physical network interface cards configured on the computing node. Referring to FIG. 3, a procedure of the method provided in this embodiment of this disclosure includes the following steps.

301. An API module of the cloud platform receives a virtual machine creation request, where the virtual machine creation request includes parameter information of a virtual network interface card occupied by a to-be-created virtual machine.

As described above, the virtual machine creation request received by the API module is initiated by a user on an input screen such as a CLI/GUI. The virtual machine creation request carries the parameter information of the virtual network interface card occupied by the to-be-created virtual machine, for example, a quantity of virtual network interface cards, a virtual network interface card bandwidth, and affinity information of the virtual network interface card. This is not further limited in this embodiment of this disclosure.

It should be noted that, as described in step 204, after receiving the virtual machine creation request, the API module further stores the foregoing parameter information in a cloud platform database. Details are not described herein again.

302. The API module invokes a scheduling module of the cloud platform, and the scheduling module obtains current resource usage information of a network interface card resource pool of each computing node on the cloud platform.

In this embodiment of this disclosure, the scheduling module may obtain the current resource usage information of the network interface card resource pool of each computing node from the cloud platform database. For the network interface card resource pool, the current resource usage information of the network interface card resource pool includes but is not limited to a quantity of current available virtual network interface cards and an available virtual network interface card bandwidth that are of each physical network interface card in the resource pool.

303. The scheduling module determines, in at least one computing node on the cloud platform based on the foregoing parameter information and the resource usage information of each network interface card resource pool, a target computing node used to create the virtual machine.

The scheduling module provided in this embodiment of this disclosure is divided into a first scheduling module and a second scheduling module. The first scheduling module and the second scheduling module may select a computing node at two different layers.

For the first scheduling module, in addition to obtaining the foregoing parameter information, the first scheduling module may additionally obtain a current available CPU resource and a current available memory resource that are of each computing node on the cloud platform, and further preliminarily select, in the at least one computing node on the cloud platform based on the current available CPU resource and the current available memory resource that are of each computing node, a candidate computing node.

For the second scheduling module, the second scheduling module may further select, based on the candidate computing node and the foregoing parameter information, an optimal computing node for creating the virtual machine. In other words, the second scheduling module determines, from the candidate computing node based on the parameter information and the current resource usage information of each network interface card resource pool, the target computing node for creating the virtual machine. For example, if current resource usage information of a network interface card resource pool can meet a requirement of the foregoing parameter information, the network interface card resource pool may be used as the target computing node. When the optimal computing node is selected from the candidate computing node, weight sorting may be performed on each computing node based on the current resource usage information of each network interface card resource pool. For example, a computing node with more available resources has a larger weight value. Further, the optimal computing node is selected based on parameter information of the to-be-created virtual machine. For example, a quantity of virtual network interface cards and a virtual network interface card bandwidth that are of a network interface card resource pool meet a requirement. However, in this embodiment of this disclosure, whether the network interface card resource pool meets an affinity information requirement of a virtual network interface card occupied by the to-be-created virtual machine is further checked.

For example, it is assumed that the foregoing parameter information indicates that there are three virtual network interface cards, a bandwidth of each virtual network interface card is 10 megabits per second (M), and affinity is met between virtual network interface cards. In this case, if a quantity of current available virtual network interface cards of a physical network interface card in a network interface card resource pool is four, and an available virtual network interface card bandwidth is 40 M, the network interface card resource pool may be determined as the target computing node.

In another embodiment, after determining the target computing node, the scheduling module may further recalculate resource usage information of the network interface card resource pool of the target computing node based on the parameter information of the virtual network interface card occupied by the to-be-created virtual machine, and store updated resource usage information of the target computing node into the cloud platform database.

The foregoing example is still used. After the target computing node is determined, the to-be-created virtual machine occupies three virtual network interface cards and 30 M bandwidth of the network interface card resource pool of the target computing node. Therefore, for the network interface card resource pool, a current remaining resource is only one virtual network interface card and 10 M bandwidth that are of a physical network interface card.

304. The scheduling module invokes the target computing node, and the target computing node creates the virtual machine.

In this embodiment of this disclosure, after the target computing node is determined, a cloud agent module on the target computing node may be invoked to create the virtual machine. For the cloud agent module on the target computing node, the cloud agent module first obtains another resource required for creating the virtual machine. Specifically, the cloud agent module invokes an execution module to obtain detailed information of the virtual machine of the to-be-created virtual machine from the cloud platform database, and then the execution module obtains the detailed information of the virtual machine of the to-be-created virtual machine from the cloud platform database, and provides the detailed information of the virtual machine of the to-be-created virtual machine to the cloud agent module. Then, the cloud agent module may obtain, from an image module based on the detailed information of the virtual machine, image information required for creating the virtual machine, obtain, from a network module, network information required for creating the virtual machine, and obtain, from a storage module, storage information required for creating the virtual machine. After preparing various resources for creating the virtual machine, the cloud agent module invokes a hypervisor on the target computing node to create the virtual machine.

In another embodiment, after the virtual machine is created, in this embodiment of this disclosure, bandwidth QoS is further set for a virtual network interface card of the created virtual machine. Specifically, if a current bandwidth of any virtual network interface card occupied by the created virtual machine is greater than a bandwidth initially specified by the user, in this embodiment of this disclosure, the bandwidth occupied by the virtual network interface card is limited within the initially specified bandwidth in order to ensure that the bandwidth is appropriately used between virtual machines and between network interface cards in the virtual machine, and avoid mutual preemption of a bandwidth resource and affecting an upper-layer service.

In conclusion, the embodiments of this disclosure bring the following beneficial effects.

A. According to the embodiments of this disclosure, a network resource on each computing node on the cloud platform is pooled, and a network interface card resource pool is configured for each computing node. Therefore, resources of all physical network interface cards configured on each computing node are centrally scheduled for use by an upper-layer service. Therefore, the cloud platform can automatically schedule the to-be-created virtual machine to an appropriate computing node for creation based on the parameter information of the virtual network interface card occupied by the to-be-created virtual machine and the current resource usage information of the network interface card resource pool of each computing node. Therefore, in the embodiments of this disclosure, a user does not need to independently select an appropriate computing node, different performance requirements of different virtual machines are considered, and a situation in which a computing node resource is insufficient because a plurality of virtual machines having high requirements on a bandwidth and latency are configured on a same computing node does not occur. This fully and appropriately uses a network resource of the computing node. In addition, in the embodiments of this disclosure, because the user does not need to perform complex resource planning in various situations, complexity of service provisioning is low, and system performance is improved.

B. In the embodiments of this disclosure, on a basis of constructing the network interface card resource pool, bandwidth QoS can be further set for a virtual network interface card occupied by a created virtual machine. This ensures that the bandwidth is appropriately used between virtual machines and between network interface cards in the virtual machine, and avoids mutual preemption of a bandwidth resource and affecting the upper-layer service.

C. In the embodiments of this disclosure, on the basis of constructing the network interface card resource pool, affinity and anti-affinity of the virtual network interface card are introduced. The affinity information is specified. For example, different virtual network interface cards are specified to be from a same physical network interface card. This can improve forwarding efficiency. If different virtual network interface cards are specified to be from different physical network interface cards, even if one physical network interface card is faulty, another virtual network interface card of the virtual machine is not affected. This can improve reliability of the virtual machine.

In another embodiment, an open-source OPENSTACK is used as an example. Modules in the system architecture diagram shown in FIG. 1 may be instantiated into components of the OPENSTACK shown in FIG. 4.

Figure 4:
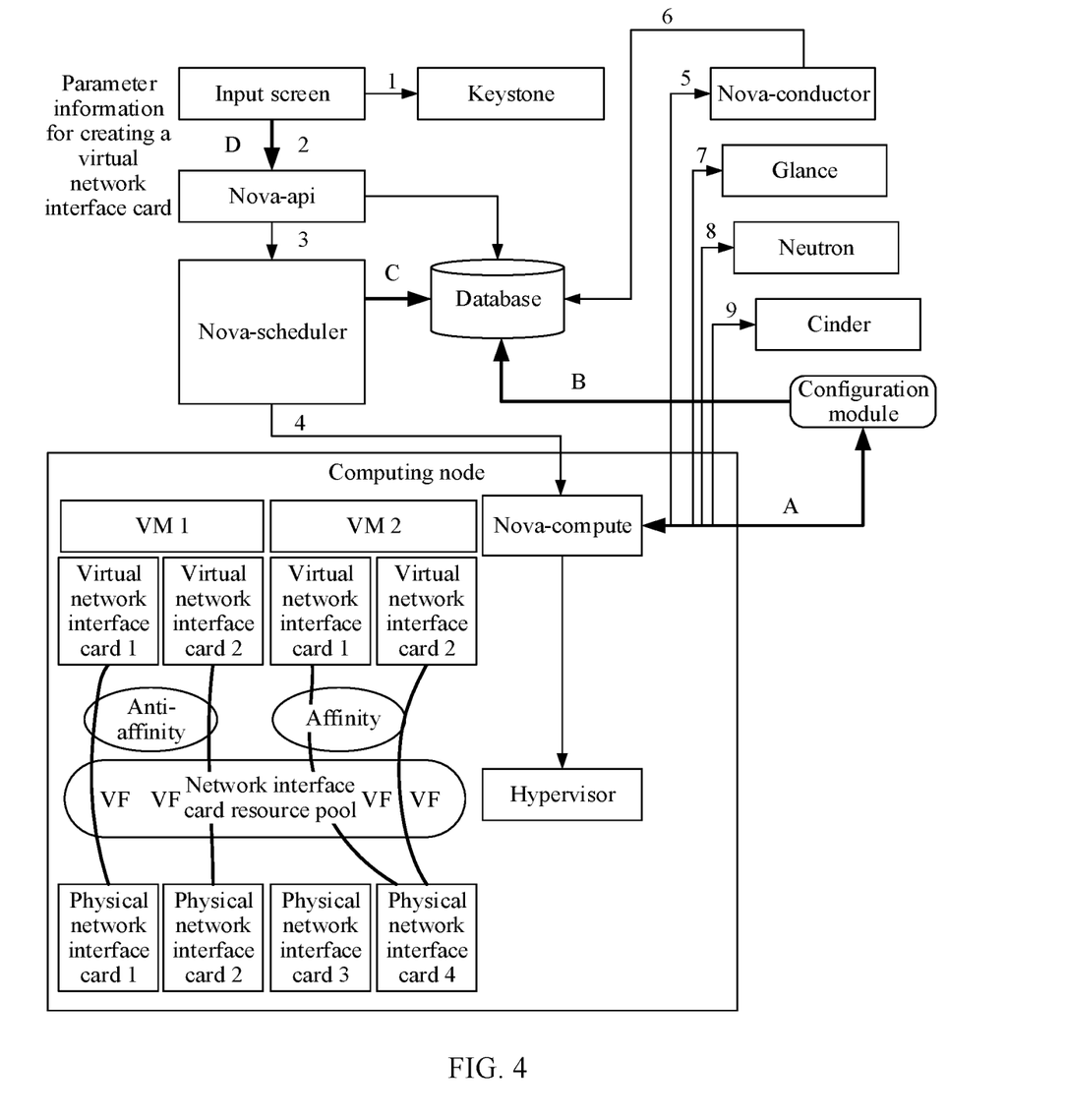
FIG. 4 is an architectural diagram of a cloud platform using an open-source OPENSTACK as an example according to an embodiment of this disclosure.

Keystone is similar to the authentication module in FIG. 1. In the OPENSTACK, the Keystone is a project name of OPENSTACK Identity and authenticates all other OPENSTACK projects. The service provides a token, a policy, and a directory using an OPENSTACK API.

Glance is similar to the image module in FIG. 1 and provides virtual machine image query, upload, and download services.

The Glance provides a restful API to query metadata of the virtual machine image and obtain image content. The virtual machine image can be stored on a plurality of storages using the Glance, such as simple file storage or object storage.

Neutron is similar to the network module in FIG. 1, and provides network support for an entire OPENSTACK environment, including layer 2 switching, layer 3 routing, load balancing, a firewall, a virtual private network (VPN), and the like.

Cinder is similar to the storage module in FIG. 1. A core function of the Cinder is to manage a volume, including processing the volume, a volume type, a volume snapshot, and a volume backup. Cinder provides unified interfaces for different backend storage devices. Different block device service vendors implement their driver support in the Cinder to integrate with the OPENSTACK.

Nova is a computing resource management project in the OPENSTACK. It is responsible for virtual machine lifecycle management and other computing resource lifecycle management, including several important components, such as Nova-api, Nova-conductor, Nova-scheduler, and Nova-compute. The Nova-api performs operations such as parameter extraction, parameter verification, and data object operation, and is similar to the API module in FIG. 1.

The Nova-conductor implements a complex operation, and is a database access agent of the nova-compute.

The Nova-scheduler schedules a virtual machine location, and is similar to the scheduling module in FIG. 1.

The Nova-compute manages a computing node and locally implements virtual machine lifecycle management, and is similar to the cloud agent module in FIG. 1.

Figure 5:
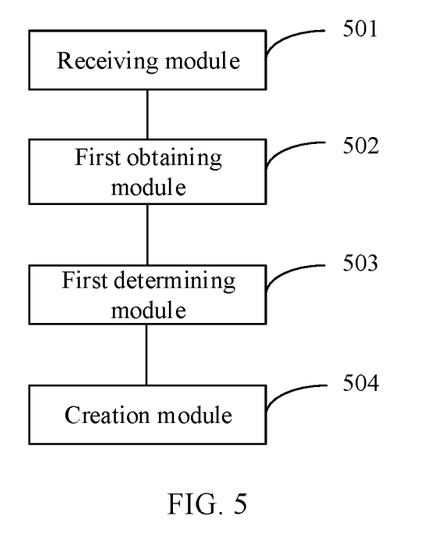
FIG. 5 is a schematic structural diagram of an apparatus for creating a virtual machine according to an embodiment of this disclosure.

FIG. 5 is a schematic structural diagram of an apparatus for creating a virtual machine according to an embodiment of this disclosure. The apparatus is applied to a cloud platform. Each computing node on the cloud platform includes a network interface card resource pool, and one network interface card resource pool includes each physical network interface card configured on the computing node. Referring to FIG. 5, the apparatus includes a receiving module 501 configured to receive a virtual machine creation request, where the virtual machine creation request includes parameter information of a virtual network interface card occupied by a to-be-created virtual machine, a first obtaining module 502 configured to obtain current resource usage information of the network interface card resource pool of each computing node on the cloud platform, a first determining module 503 configured to determine, in at least one computing node on the cloud platform based on the parameter information and the current resource usage information of each network interface card resource pool, a target computing node used to create a virtual machine, and a creation module 504 configured to invoke the target computing node to create the virtual machine.

According to the apparatus provided in the embodiments of this disclosure, a network resource on each computing node on the cloud platform is pooled, and a network interface card resource pool is configured for each computing node. Therefore, resources of all physical network interface cards configured on each computing node are centrally scheduled for use by an upper-layer service. Therefore, the cloud platform can automatically schedule the to-be-created virtual machine to an appropriate computing node for creation based on the parameter information of the virtual network interface card occupied by the to-be-created virtual machine and the current resource usage information of the network interface card resource pool of each computing node. Therefore, in the embodiments of this disclosure, a user does not need to independently select an appropriate computing node, different performance requirements of different virtual machines are considered, and a situation in which a computing node resource is insufficient because a plurality of virtual machines having high requirements on a bandwidth and latency are configured on a same computing node does not occur. This fully and appropriately uses a network resource of the computing node. In addition, in the embodiments of this disclosure, because the user does not need to perform complex resource planning in various situations, complexity of service provisioning is low, and system performance is improved.

In another embodiment, the parameter information includes a quantity of virtual network interface cards and a virtual network interface card bandwidth that are occupied by the to-be-created virtual machine, and affinity information of the virtual network interface card occupied by the virtual machine.

The affinity information is used to indicate whether different virtual network interface cards occupied by a same virtual machine come from a same physical network interface card.

When the affinity information indicates keeping affinity, the different virtual network interface cards occupied by the same virtual machine come from the same physical network interface card.

When the affinity information indicates keeping anti-affinity, the different virtual network interface cards occupied by the same virtual machine come from different physical network interface cards.

In another embodiment, the apparatus further includes a second obtaining module configured to obtain network interface card information of each physical network interface card in the network interface card resource pool of each computing node, a second determining module configured to, for each network interface card resource pool, determine a quantity of available virtual network interface cards and an available virtual network interface card bandwidth that are of each physical network interface card in the network interface card resource pool based on the network interface card information of each physical network interface card in the network interface card resource pool, and use the quantity of available virtual network interface cards and the available virtual network interface card bandwidth that are of each physical network interface card in the network interface card resource pool as the resource usage information of the network interface card resource pool, and a storage module configured to store the resource usage information of the network interface card resource pool into a cloud platform database, where the second obtaining module is configured to obtain the current resource usage information of the network interface card resource pool of each computing node from the cloud platform database.

In another embodiment, where the second determining module is further configured to, after the target computing node is determined, recalculate resource usage information of a network interface card resource pool of the target computing node based on the parameter information, and the storage module is further configured to store updated resource usage information of the target computing node into the cloud platform database.

In another embodiment, the first determining module is further configured to obtain a current available CPU resource and a current available memory resource of each computing node on the cloud platform, determine a candidate computing node in the at least one computing node on the cloud platform based on the current available CPU resource and the current available memory resource of each computing node, and determine the target computing node in the candidate computing node based on the parameter information and the current resource usage information of each network interface card resource pool.

In another embodiment, the apparatus further includes a processing module configured to, after the virtual machine is created, if a current bandwidth of any virtual network interface card occupied by the virtual machine is greater than a target bandwidth specified in the parameter information, limit the bandwidth occupied by the any virtual network interface card within the target bandwidth.

All the foregoing optional technical solutions may be randomly combined to form optional embodiments of this disclosure. Details are not described herein.

It should be noted that when the apparatus for creating a virtual machine according to the foregoing embodiment creates the virtual machine, division of the foregoing function modules is merely an example. In an embodiment, the foregoing functions can be allocated to different modules and implemented as necessary. In other words, an inner structure of the apparatus is divided into different function modules to implement all or a part of the functions described above. In addition, the apparatus for creating a virtual machine provided in the foregoing embodiment and the embodiment of the method for creating a virtual machine belong to a same concept. For a specific implementation process of the apparatus, refer to the method embodiment. Details are not described herein again.

Figure 6:
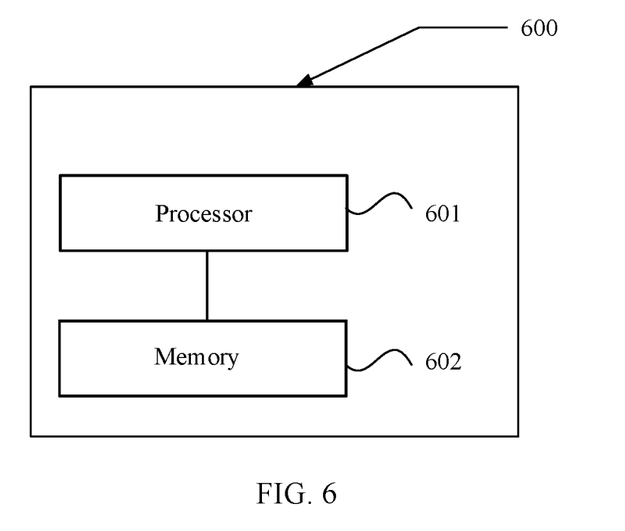
FIG. 6 is a schematic structural diagram of an apparatus for creating a virtual machine according to an embodiment of this disclosure.

FIG. 6 is a schematic structural diagram of an apparatus for creating a virtual machine according to an embodiment of this disclosure. The apparatus 600 may have a relatively large difference due to different configurations or performance, and may include one or more processors (CPU) 601 and one or more memories 602. The memory 602 stores at least one instruction, and the at least one instruction is loaded and executed by the processor 601 to implement the method for creating a virtual machine provided in the foregoing method embodiments. Certainly, the apparatus may further include components such as a wired or wireless network interface, a keyboard, and an I/O interface, to perform I/O. The apparatus may further include another component configured to implement a function of the apparatus. Details are not described herein.

In an example embodiment, a computer-readable storage medium is further provided, for example, a memory including an instruction. The instruction may be executed by a processor in a terminal to complete the method for creating a virtual machine in the foregoing embodiment. For example, the computer-readable storage medium may be a read-only memory (ROM), a random access memory (RAM), a compact disc ROM (CD-ROM), a magnetic tape, a floppy disk, an optical data storage apparatus, or the like.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely alternative embodiments of this disclosure, but are not intended to limit this disclosure. Any modification, equivalent replacement, or improvement made without departing from the spirit and principle of this disclosure should fall within the protection scope of this disclosure.

What is claimed is:

1. A method for configuring a virtual machine and comprising:
    receiving a virtual machine configuration request comprising a quantity of virtual network interface cards of a virtual machine to be created and location information of the virtual network interface cards, wherein the location information specifies target physical network interface cards among physical network interface cards to create target virtual network interface cards, wherein the target physical network interface cards comprise a first physical network interface card and a second physical network interface card, wherein the target virtual network interface cards comprise a first virtual network interface card, a second virtual network interface card, and a third virtual network interface card, wherein the first virtual network interface card is based on the first physical network interface card that supports single-root input/output virtualization (SR-IOV) technology, wherein the second virtual network interface card and the third virtual network interface card are based on the second physical network interface card that supports the SR-IOV technology;
    obtaining image information for creating the virtual machine;
    creating the virtual machine based on the virtual machine configuration request and the image information, wherein the first virtual network interface card, the second virtual network interface card, and the third virtual network interface card are occupied by the virtual machine, wherein the first virtual network interface card, the second virtual network interface card, and the third virtual network interface card are used by an upper-layer service that runs on the virtual machine; and
    returning a virtual machine creation result to the user.

2. The method of claim 1, wherein the virtual machine configuration request further comprises central processing unit (CPU) resource information and memory resource information.

3. The method of claim 1, wherein the virtual machine configuration request is received via command line interface or graphical user interface.

4. The method of claim 1, wherein the virtual machine configuration request further comprises parameter information of a virtual network interface card occupied by a to-be-created virtual machine, and wherein the parameter information comprises a bandwidth of the virtual network interface card.

5. The method of claim 4, wherein the parameter information includes affinity information of the virtual network interface card occupied by the virtual machine.

6. The method of claim 5, wherein affinity information is used to indicate whether different virtual network interface cards occupied by a same virtual machine come from a same physical network interface card.

7. The method of claim 5, wherein affinity information is used to indicate whether different virtual network interface cards occupied by a same virtual machine come from a different physical network interface card.

8. The method of claim 1, further comprising sending valid authentication information to the user before receiving the virtual machine configuration request.

9. The method of claim 1, further comprising calculating resource usage information of the one or more of the first, second, and third virtual network interface cards.

10. The method of claim 1, further comprising updating the resource usage information into a cloud platform database.

11. An apparatus for creating a virtual machine comprising:
    one or more memories configured to store instructions; and
    one or more processors coupled to the one or more memories and configured to execute the instructions to cause the apparatus to:
        receive a virtual machine configuration request comprising a quantity of virtual network interface cards of a virtual machine to be created and location information of the virtual network interface cards, wherein the location information specifies target physical network interface cards among the physical network interface cards to create target virtual network interface cards, wherein the target physical network interface cards comprises a first physical network interface card and a second physical network interface card, wherein the target virtual network interface cards comprise a first virtual network interface card, a second virtual network interface card, and a third virtual network interface card, wherein the first virtual network interface card is based on the first physical network interface card that supports single-root input/output virtualization (SR-IOV) technology, wherein the second virtual network interface card and the third virtual network interface card are based on the second physical network interface card that supports the SR-IOV technology;

obtain image information for creating the virtual machine;

create the virtual machine based on the virtual machine configuration request and the image information, wherein the first virtual network interface card, the second virtual network interface card, and the third virtual network interface card are occupied by the virtual machine, wherein the first virtual network interface card, the second virtual network interface card, and the third virtual network interface card are used by an upper-layer service that runs on the virtual machine; and return a virtual machine creation result to the user.

12. The apparatus of claim 11, wherein the virtual machine configuration request further comprises central processing unit (CPU) resource information and memory resource information.

13. The apparatus of claim 11, wherein the virtual machine configuration request is received via command line interface or graphical user interface.

14. The apparatus of claim 11, wherein the virtual machine configuration request further comprises parameter information of a virtual network interface card occupied by a to-be-created virtual machine, and wherein the parameter information comprises a bandwidth of the virtual network interface card.

15. The apparatus of claim 11, wherein the one or more processors are further configured to execute the instructions to cause the apparatus to send valid authentication information to the user before receiving the virtual machine configuration request.

16. The apparatus of claim 11, wherein the parameter information includes affinity information of the virtual network interface card occupied by the virtual machine.

17. The apparatus of claim 16, wherein affinity information is used to indicate whether different virtual network interface cards occupied by a same virtual machine come from a same physical network interface card.

18. The apparatus of claim 16, wherein affinity information is used to indicate whether different virtual network interface cards occupied by a same virtual machine come from a different physical network interface card.

19. The apparatus of claim 11, wherein the one or more processors are further configured to execute the instructions to cause the apparatus to calculate resource usage information of the one or more of the first, second, and third virtual network interface cards.

20. The apparatus of claim 11, wherein the one or more processors are further configured to execute the instructions to cause the apparatus to update the resource usage information into a cloud platform database.

* * * * *